United States Patent [19]

Norrvi

[11] Patent Number: 5,107,749
[45] Date of Patent: Apr. 28, 1992

[54] SEPARATING DEVICE

[75] Inventor: Hans Norrvi, Vreta kloster, Sweden

[73] Assignee: Saab Missles Aktiebolag, Sweden

[21] Appl. No.: 651,238

[22] PCT Filed: Sep. 20, 1989

[86] PCT No.: PCT/SE89/00502
  § 371 Date: Feb. 12, 1991
  § 102(e) Date: Feb. 12, 1991

[87] PCT Pub. No.: WO90/03547
  PCT Pub. Date: Apr. 5, 1990

[30] Foreign Application Priority Data

Sep. 21, 1988 [SE] Sweden ............... 8803336

[51] Int. Cl.$^5$ ........................... F41F 3/06; B64D 1/04
[52] U.S. Cl. .................................. 89/1.57; 244/137.4
[58] Field of Search ................... 244/137.4; 89/1.806, 89/1.57, 1.51

[56] References Cited

U.S. PATENT DOCUMENTS

| | | | |
|---|---|---|---|
| 2,925,754 | 2/1960 | Fillman | 244/137.4 |
| 3,010,752 | 11/1961 | Geffner | 244/137.4 |
| 3,810,671 | 5/1974 | Jeffrey | 89/1.57 |
| 3,871,604 | 3/1975 | Coutin | 244/137.4 |
| 3,898,909 | 8/1975 | Craigie | 244/137.4 |
| 4,132,147 | 1/1979 | Contaldo | 244/137.4 |
| 4,187,760 | 2/1980 | Holt | 244/137.4 |
| 4,257,639 | 3/1981 | Stock | 89/1.57 |
| 4,453,449 | 6/1984 | Hollmann | 89/1.806 |

FOREIGN PATENT DOCUMENTS 0182714 5/1986 European Pat. Off. .

Primary Examiner—David H. Brown
Attorney, Agent, or Firm—Lowe, Price, LeBlanc & Becker

[57] ABSTRACT

A separating device for quick mutual separation of objects and vehicles, especially air and space vehicles, comprises attaching elements, attached to the vehicle and the object, respectively, and arranged to interact separably in holding together the vehicle and the object. According to the invention, such a separating device is characterized primarily in that the first attaching element (1) comprises a casing with an internal first cylindric portion (2). In it a first piston (3) is arranged movable, with slide fitting, so that the portion is separated into a first (4) and a second chamber (5). The first attaching element (1) shows a preferably conically generated first grip part (6). A second attaching element (8) has a second grip part (7) which can be separably attached to the first grip part (6) with a shrinking fit for frictional connection. A connecting channel (11, 12) connects the second chamber (5) with the surfaces (9, 10) of the grip parts. A source of pressure (14, 28) is arranged to increase essentially instantaneously the fluid pressure in the first chamber (4) so that the piston (3) will cause a liquid to separate the surfaces (9, 10) via the connecting channel (11, 12), releasing the grip parts (6, 7) from each other, for the separation of the object and the vehicle.

7 Claims, 3 Drawing Sheets

FIGURE 3A
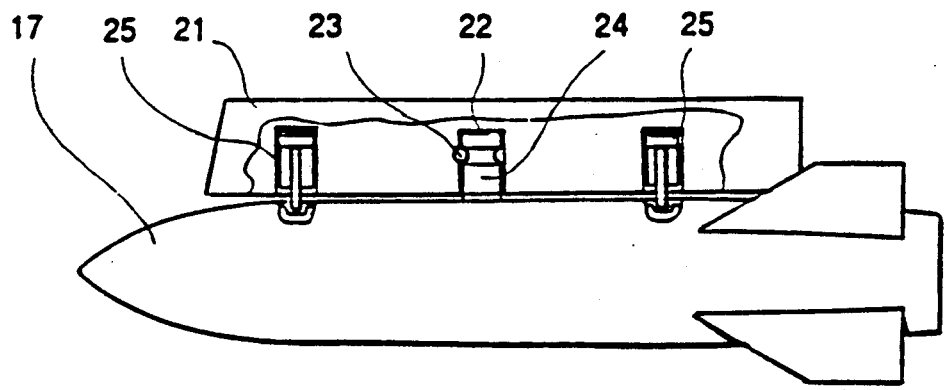
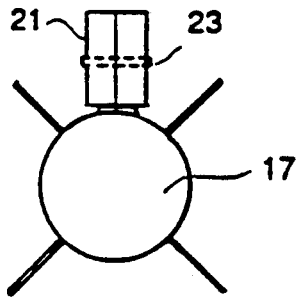
FIGURE 3B
FIGURE 4
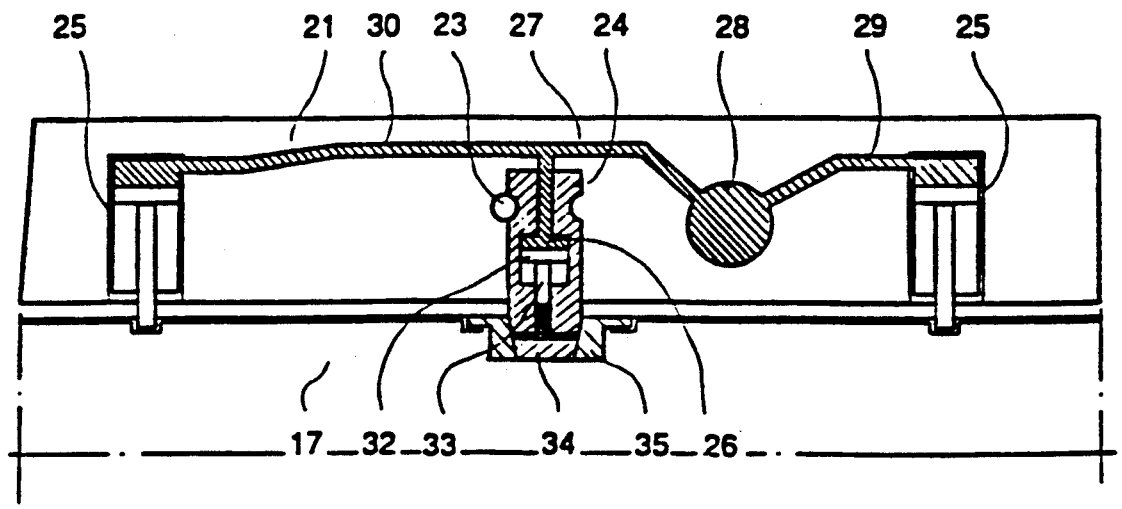

SEPARATING DEVICE

The present invention relates to a separating device for quick mutual separation of objects and vehicles, especially air and space vehicles, comprising attaching elements attached to the air vehicle and the object, arranged to interact separably in holding together the vehicle and the object.

The concepts of "vehicle" and "object" have in this connection a relatively wide meaning. By vehicle it is meant every movable carrier of one or more objects. The carrier may e.g. be provided with its own driving device, such as a jet motor or a rocket engine or other driving device. However, the carrier may also consist of a ballistic projectile or the like. The object may in turn consist of a missile, bomb or satellite that is to be separated from a carrier rocket, or may be some other arbitrary object.

It is evident from the examples named above that separating devices of the above-mentioned type can have numerous applications. In all cases, the aim is to achieve a precisely controllable separation. Hitherto existing separating devices of this type have in many cases been complicated and expensive, and also they have often shown inadequate precision in use.

The object of the present invention is therefore to provide a separating device of the introductorily-mentioned type which has a relatively simple construction and is therefore relatively inexpensive and which admits a precisely controllable separation.

According to the invention such a separating device is characterized primarily in that the first attaching element comprises a casing with an internal first cylindric portion in which a first piston is arranged movable in the axial direction of the portion, sliding essentially liquidtightly along the wall of the portion, separating the portion in a first and a second chamber, the first attaching element comprising a preferably conically generated first grip part, whereas the second attaching element is formed with a second grip part that is separably attachable to the first grip part with a shrinking fit, so that the surfaces of the grip parts are in frictional connection, the arrangement being that at least one connecting channel is arranged to connect the said second chamber with the said surfaces, a source of pressure being arranged to increase principally instantaneously the fluid pressure in the first chamber so that the piston will cause a liquid to separate the surfaces via the connecting channel, whereby the grip parts are released from each other, for the separation of the object and the vehicle.

The first attaching element can be attached either to the vehicle or the object, and this applies also to the second attaching element.

The first and second grip parts, both of which are preferably provided with conically generated external and internal surfaces, may also optionally be included in the first and the second attaching element, respectively.

Said connecting channel may also be arranged either in the first or the second attaching element.

In a preferred embodiment of the separating device according to the invention, the connecting channel comprises a second cylindric portion having its axis parallel to the axis of the first cylindric position, in which second cylindric portion a second piston rigidly connected with the first piston is arranged axially movable with essentially liquidtight fitting against the wall of the second cylindric portion, the second portion piston showing a smaller pressure cross section than the first piston.

The above-described embodiment is particularly advantageous when the liquid, i.e. usually an oil, is included in a liquidtight, perforatable container that is placed in the second cylindric portion. A perforating means is then arranged so that when the second piston exerts pressure on the container the perforating means will connect the liquid to said surfaces. The perforating means may e.g. be formed as a cannula point projecting upwards from the bottom of the second cylindric portion. Other embodiments are of course possible. The container is suitably made of a metal foil.

The source of pressure can be of different types and can be placed in different places in different embodiments of the separating device according to the invention. It can be for instance consist of an electrically detonatable blasting charge.

The source of pressure can also be placed outside the first chamber. In the cases when the first attaching element is separably attached in a vehicle-fixed launcher, for instance in a recess in the launcher, which is a suitable embodiment of the separating device according to the invention, the source of pressure is suitably arranged in the launcher, connected to the first chamber with a pressure pipe.

The separating device according to the invention will now be described in more detail with reference to the accompanying figures of which:

FIG. 3a shows schematically, partly in longitudinal section, a missile fastened by means of a separating device at a launcher;

FIG. 3b shows the same as FIG. 3a from the front;

FIG. 4 shows a longitudinal section of a portion of a missile and the launcher in FIG. 3.

Figure 1:
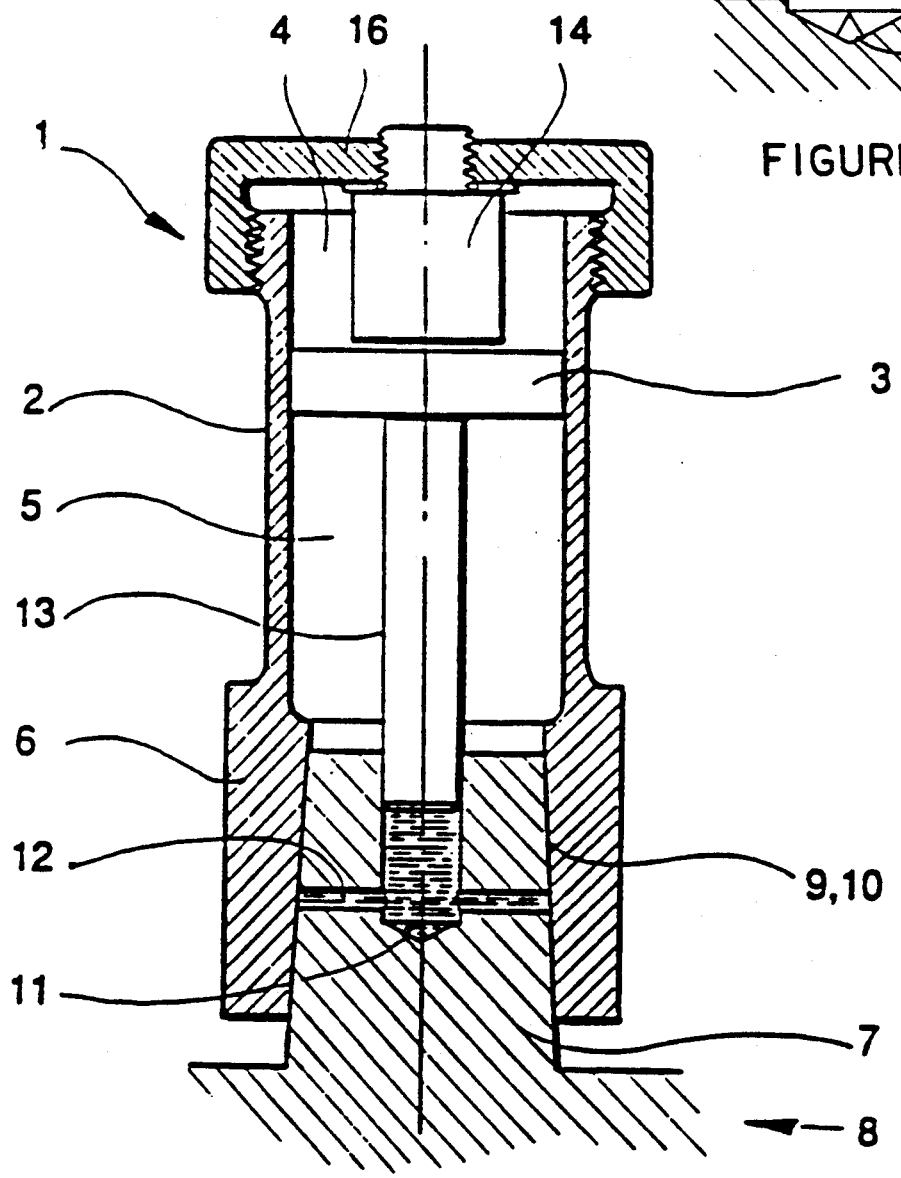
FIG. 1 shows a longitudinal section through a separating device.

In FIG. 1, 1 designates generally a first attaching element in the form of a casing with a first cylindric portion 2, in which a first piston 3 is arranged axially movable with slide fitting at the wall of the cylindric portion. This first piston 3 separates the first cylindric portion into a first chamber 4 and a second chamber 5. The first attaching element is formed with a first grip part 6 with an internally conically generated wall (i.e. a frustum of a cone). In this first grip part there is fitted with a shrinking fit a second grip part 7 representing a part of a second attaching element 8, which is not shown in detail in this figure. The second grip part 7 is formed as an externally (frustum) conical dowel. The two grip parts are thus in fricional connection with their respective surfaces 9, 10. The second grip part 7 is provided with a second cylindric portion 11 with its axis in this case coaxial with the axis of the first cylindric portion. This second cylindric portion 11 is open to the second chamber 5 to receive a second piston 13 and is connected to surfaces 9, 10 through connecting channel 12. The first piston 3 is rigidly connected with a second piston 13, which is fitted with liquidtight fitting in the second cylindric portion 11 with axial mobility. The connecting channel is filled with oil. In the first chamber 4 there is placed an electrically detonatable blasting charge 14. The first chamber is closed in its upper end by a cap 16.

Figure 1A:
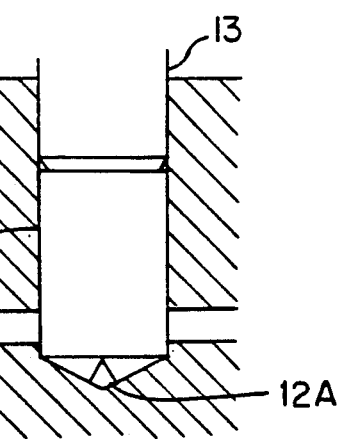
FIG. 1A shows a partial section through the separating device of FIG. 1 illustrating the perforatable container prior to perforation.

The above described embodiment is particularly advantageous when the liquid, i.e., usually an oil is included in a liquid tight, perforable container 11A shown in FIG. 1A placed in the second cylindric portion. The perforating means 12A is arranged as a cannular point projecting upwards from the bottom of the second cylindric portion so that when the second piston 13 exerts pressure on the container 11A the perforating cannular point 12A will pierce the container 11A, preferably made of a metal foil, to release the oil and connect it via channels 11 and 12 to the surfaces 9, 10.

The separating device works so that when a separation of the attaching elements from each other is desired, the blasting charge 14 is caused to detonate, whereupon the developed gas acts with its pressure on the first piston in the first chamber 4. The second piston 13, which shows a smaller pressure cross section than the first piston, is then caused by the first piston 3 to press the liquid in the connecting channels 11, 12 with an increased pressure relative to the pressure in the first chamber, in order to separate the surfaces 9, 10 from each other, so that the grip parts 6, 7 come loose from each other and the attaching elements are separated, releasing the vehicle and the object from each other. The axial movement of the second piston contribute also to the separation of the grip parts from each other.

Figure 2A:
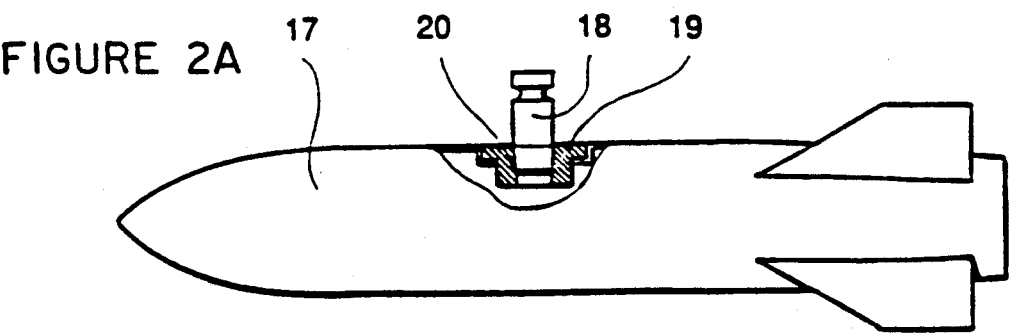
FIG. 2a shows a schematically, partly in longitudinal section, a missile with a separating device.
Figure 2B:
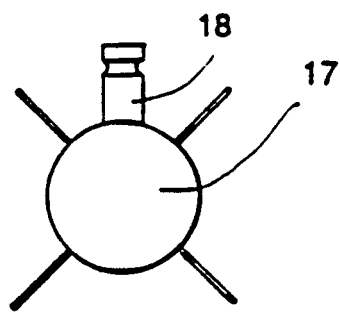
FIG. 2b shows the same as FIG. 2a from the front.

In FIG. 2a, a missile is designated by 17, a first attaching element by 18 and a second attaching element by 19. In this case the first attaching element 18 is thus provided with a first grip part 20, with an external (truncated) conical surface and the second attaching element, attached to the missile with an internal (truncated) conical surface in the second grip part.

An embodiment comprising a vehicle-fixed launcher 21 with a recess 22 is shown in FIG. 3a. In this recess there is a first attaching element 24 attached with a cotter 23. Two cylinder/piston elements 25 are also fastened in the launcher 21.

In FIG. 4, this construction is shown more in detail. The first chamber 26 of the first attaching element 24 is connected with a pressure tube 27 to a source of pressure 28 which can contain a detonatable blasting charge or be of other kind. This source of pressure is also connected to the cylinder/piston elements 25 via pressure tubes 29, 30.

Thus, the source of pressure 28 acts simultaneously on the first piston 32 in the first attaching element 24 and the pistons in the piston/cylinder elements 25. In the first case the first piston 32 presses down the second piston 33 which presses out liquid to separate the grip parts 34, 35 so that these are released from each other. In the second case the pistons are pressed out in order to work ejectingly on the missile from the launcher, so that the missile is released in the right direction.

I claim:

1. A separating device for quick mutual separation of objects and vehicles comprising first and second attaching elements attached to the vehicle and the object, arranged to interact separably in holding together the vehicle and the object, characterized in that the first attaching element (1) comprises a casing with an internal first cylindric portion (2) in which a first piston (3) is arranged movable in the axial direction of the portion, sliding essentially liquid tightly along the wall of the portion, separating the portion into a first (4) and a second chamber (5), the first attaching element (1) comprising a conically generated first grip part (6), whereas the second attaching element (8) is formed with a second grip part (7) that is separably attachable to the first grip part (6) with a shrinking fit, so that the surfaces (9, 10) of the grip parts are in frictional connection, the arrangement being that at least one connecting channel (11, 12) is arranged to connect the said second chamber (5) with said surfaces (9, 10), a pressure generating means (14, 29) in communication with the first chamber and arranged to increase substantially instantaneously the fluid pressure in the first chamber (4) so that the piston (3) will cause a liquid to separate the surfaces (9, 10) via the connecting channel (11, 12), whereby the grip parts (6, 7) are released from each other, for the separation of the object and the vehicle.

2. A separating device according to claim 1, characterized in that said source of pressure consists of an electrically detonatable blasting charge (14) arranged in the first chamber.

3. A separating device according to claim 1, characterized in that the connecting channel comprises a second cylindric portion (11) having its axis parallel to the axis of the first cylindric portion (2), in which second cylindric portion a second piston (13) rigidly connected with the first piston (3) is arranged axially movable with essentially liquid tight fitting against the wall of the second cylindric portion to close the connection between the second chamber (5) and said surfaces (9, 10), the second piston (13) showing a smaller pressure cross section than the first piston (3).

4. A separating device according to claim 3, characterized in that a liquid tight perforatable container (11A) is placed in said second cylindric portion (11) containing said liquid, a perforating means (12A) being arranged so that when the second piston (13) exerts pressure on the container the perforating means will connect the liquid to said surfaces (9, 10).

5. A separating device according to claim 1, characterized in that said source of pressure (18) is arranged outside the first chamber (4).

6. A separating device according to claim 5, characterized in that the first attaching element (1) is separably attached to a vehicle-fixed launcher (21) in a recess (22) in the launcher (21).

7. A separating device according to claim 6, characterized in that said source of pressure (28) is placed in the launcher (21), connected to the first chamber with a pressure tube (27, 29, 30).

* * * * *